(12) United States Patent
Gauttier et al.

(10) Patent No.: US 11,771,200 B2
(45) Date of Patent: Oct. 3, 2023

(54) APPLICATION OF A PRODUCT TO A SUPERFICIAL PART OF THE HUMAN BODY

(71) Applicant: TEXEN, Brion (FR)

(72) Inventors: William Gauttier, Bourg en Bresse (FR); Ludovic Anceau, Saint Malo (FR)

(73) Assignee: TEXEN, Brion (FR)

( * ) Notice: Subject to any disclaimer, the term of this patent is extended or adjusted under 35 U.S.C. 154(b) by 699 days.

(21) Appl. No.: 16/775,100

(22) Filed: Jan. 28, 2020

(65) Prior Publication Data

US 2020/0237074 A1 Jul. 30, 2020

(30) Foreign Application Priority Data

Jan. 28, 2019 (FR) ...................................... 1900742

(51) Int. Cl.
*A45D 34/04* (2006.01)
*A45D 33/00* (2006.01)
(Continued)

(52) U.S. Cl.
CPC ........... *A45D 34/046* (2013.01); *A45D 33/00* (2013.01); *A45D 34/04* (2013.01); *A45D 34/043* (2013.01);
(Continued)

(58) Field of Classification Search
CPC .... A45D 34/04; A45D 40/262; A45D 34/043; A45D 34/046; A45D 40/265;
(Continued)

(56) References Cited

U.S. PATENT DOCUMENTS 4,776,356 A 10/1988 Jou et al.
5,881,743 A 3/1999 Nadel
(Continued)

FOREIGN PATENT DOCUMENTS

EP 1070468 A1 1/2001
EP 0952908 B1 6/2002
(Continued)

OTHER PUBLICATIONS

French Application No. 1900742; Search Report dated Nov. 19, 2019—12 pgs. (In French; relevance found in the citations therein).

*Primary Examiner* — Monica A Huson
(74) *Attorney, Agent, or Firm* — Cozen O'Connor

(57) ABSTRACT

Process for manufacturing an applicator (3) comprising a loading/application part (4), with the succession of steps a/ a mould is provided, b/ thermoplastic elastomer material (M) with a hardness before injection of between 5 Shore A and 70 Shore A and inert gas (G) suitable for a physical foaming process are provided, c/ they are mixed, d/ the mixture is injection-moulded in the mould, e/ after the thermoplastic elastomer material has cooled and physical foaming thereof has been carried out, the filler/application part (4) which has an inner structure (11) with closed cells (11a) and a microporous surface structure (12) is removed, and with the absence of a step of depositing on the microporous surface structure (12) a flock or flock adhesion material.

7 Claims, 3 Drawing Sheets

(51) Int. Cl.
  *A45D 40/26* (2006.01)
  *C08J 9/06* (2006.01)
  *B29C 44/02* (2006.01)
  *B29K 21/00* (2006.01)
  *B29K 105/04* (2006.01)
  *B29L 31/00* (2006.01)

(52) U.S. Cl.
  CPC ......... *A45D 40/264* (2013.01); *A45D 40/267* (2013.01); *C08J 9/06* (2013.01); *A45D 2200/1009* (2013.01); *B29C 44/02* (2013.01); *B29K 2021/003* (2013.01); *B29K 2105/046* (2013.01); *B29K 2995/007* (2013.01); *B29L 2031/718* (2013.01)

(58) Field of Classification Search
  CPC .... A45D 34/042; A45D 33/00; A45D 40/267; A45D 40/264; A45D 2200/1009; B29C 44/42; B29C 44/0461; B29C 44/02; B29C 44/005; B29C 44/355; B29C 44/356; C08J 9/06; B29K 2021/003; B29K 2995/007; B29K 2105/046; B29K 2105/041; B29L 2031/718
  See application file for complete search history.

(56) References Cited

U.S. PATENT DOCUMENTS

| | | |
|---|---|---|
| 7,134,799 B2 | 11/2006 | Gueret |
| 8,127,777 B2 | 3/2012 | Gueret |
| 2006/0058714 A1 | 3/2006 | Rhoades |
| 2006/0252358 A1 | 11/2006 | Preston et al. |
| 2009/0045089 A1 | 2/2009 | Sheppard et al. |
| 2009/0283033 A1* | 11/2009 | Akaishi ............. B05C 17/00516 118/410 |
| 2013/0011657 A1* | 1/2013 | Kato ........................ C08J 9/122 521/97 |
| 2013/0276812 A1 | 10/2013 | Kulik et al. |
| 2018/0085974 A1 | 3/2018 | Hugi |

FOREIGN PATENT DOCUMENTS

| | | |
|---|---|---|
| EP | 0923443 B1 | 11/2002 |
| EP | 1264672 A1 | 12/2002 |
| EP | 1275485 A2 | 1/2003 |
| EP | 1165301 B1 | 2/2004 |
| EP | 1475208 A2 | 11/2004 |
| EP | 1639912 A1 | 3/2006 |
| EP | 1920677 A1 | 5/2008 |
| EP | 2172127 A1 | 4/2010 |
| EP | 2164360 B1 | 9/2012 |
| EP | 3300625 A1 | 4/2018 |
| FR | 2518381 A1 | 6/1983 |
| FR | 2745272 A1 | 8/1997 |
| FR | 2751854 A1 | 2/1998 |
| FR | 2860960 A1 | 4/2005 |
| FR | 2868264 A1 | 10/2005 |
| FR | 2872999 A1 | 1/2006 |
| FR | 2895887 A1 | 7/2007 |
| FR | 2962888 A1 | 1/2012 |
| FR | 2994068 A1 | 2/2014 |
| FR | 3014654 A1 | 6/2015 |
| FR | 3035577 A1 | 11/2016 |
| FR | 3036594 A1 | 12/2016 |
| FR | 3041510 A1 | 3/2017 |
| FR | 3059878 A1 | 6/2018 |
| FR | 3066367 A1 | 11/2018 |
| WO | WO 03029098 A1 | 4/2003 |
| WO | WO 2009151202 A1 | 12/2009 |
| WO | WO 2015/193937 | 12/2015 |
| WO | WO 2016/016133 | 2/2016 |
| WO | WO 2016108357 A1 | 7/2016 |
| WO | WO 2016/174332 A1 | 11/2016 |
| WO | WO 2017/220538 | 12/2017 |
| WO | WO 2018007620 A1 | 1/2018 |
| WO | WO 2018/130371 | 7/2018 |

\* cited by examiner

APPLICATION OF A PRODUCT TO A SUPERFICIAL PART OF THE HUMAN BODY

CROSS-REFERENCE TO RELATED APPLICATION

This application claims priority to French Patent Application No. 1900742, filed Jan. 28, 2019, which is incorporated herein by reference.

TECHNICAL FIELD OF THE INVENTION

The invention relates to the application of a product (conventionally referred to as the product to be applied) to a surface part of the human body, and more particularly relates to (i) a method of manufacturing an applicator for a product to be applied comprising a loading and application part (conventionally referred to as the loading/application part), (ii) an applicator for a product to be applied comprising a loading/application part, and (iii) an application assembly comprising such an applicator.

In the context of the invention, the application of product to be applied to a surface part of the human body is achieved by applying to the human body at the desired location either the loading/application part loaded with product to be applied or the product to be applied loaded on the loading/application part. Depending on the case, the application of the product to be applied is carried out in the manner of dabbing or sliding movement on the surface part of the human body in question.

In the context of the invention, the term "apply" and the term "application" are to be understood as meaning to apply, put on, without noticeable pressure or with very little pressure, so as not to leave an indentation on the surface part of the human body under consideration.

In the main case covered by the invention, the product to be applied is a cosmetic product, i.e. a substance or mixture in liquid, paste, emulsion or powder form, intended to be brought into contact with a surface part of the human body in order to modify its appearance, cleanse it, protect it, keep it in good condition, such as, for example, a gloss or lipstick, mascara, make-up powder, this list being only illustrative.

However, the invention also covers the case where the product to be applied is a medicinal product, intended to be brought into contact with a surface part of the human body, in a manner analogous to a cosmetic product. Such a medicinal product is a substance or composition presented as having properties for treating or preventing disease in humans, or for making a medical diagnosis or for restoring, correcting or modifying physiological functions by exerting a pharmacological, immunological or metabolic action. For example, it may be a disinfectant or a skin healing agent, this list being only illustrative.

PRIOR ART

Professional applicators, in the sense that this has been defined, are familiar with a wide variety of designs of such applicators, which comprise a part conventionally referred to as the loading/application part and, more often than not, one or more other parts for support and/or handling by the user and/or for rigid removable association for example with a container of product to be applied and/or for closing the container. Thus, according to several typical embodiments, the applicator comprises a rod which, on one side, is rigidly associated with the loading/application part by supporting it and which, on the opposite side, is rigidly associated with a cap-shaped part serving to handle the applicator and to be removably mounted on the container of product to be applied by closing it. Such applicators are mass-produced objects, with a maximum overall size of a few centimetres in length and one centimetre in diameter and a low weight of about 10 grams. The loading/application part has a maximum overall size of about one centimetre in length and diameter and a weight of about 1 gram.

The loading/application part can be made in different versions depending on the use. A distinction can thus be made between loading/application parts (conventionally referred to as "tapered") characterised in that they comprise elongated fine parts, such as bristles, filaments, teeth, pins or the like, in addition to any flocks, and loading/application parts (conventionally referred to as "compact") characterised in that they do not comprise such elongated fine parts as bristles, filaments, teeth, but are in a more compact and massive form, such as a ball, cone, ovoid, bulb, barrel, diabolo, pyramid, paddle or spatula, spoon, possibly with an open cavity between arms, or the like, etc., or in the form of a ball, cone, ovoid, bulb, barrel, diabolo, pyramid, paddle or spatula, spoon, possibly with an open cavity between arms, or the like, if necessary with flocks. It is understood that the terms "tapered" and "compact" are to be understood as expressing the meaning just given to them and that these terms apply to the applicator in the same manner as for its loading/application part.

Tapered loading/application parts are represented in FR3014654, FR3066367, FR3059878, WO2018130371. Collected loading/application parts are represented in documents U.S. Pat. No. 7,134,799, FR2745272, FR3036594, FR2518381, FR2994068, WO2016/174332, EP1920677, EP1639912, FR2872999 and WO2016/016133. These documents are provided for illustrative purposes only.

WO03029098 refers to an applicator comprising a support having a flattened dome-shaped wall to which is attached an applicator member presented as a fibrous, cellular or alveolar or porous element, such as an open-cell or semi-open-cell foam, a woven, non-woven, felt not further defined.

FR2751854 states that "although a sponge puff made of a closed-cell foam material is used for the application of liquid-type cosmetics and has characteristics such that it is impermeable to an excess of liquid cosmetics, there are still many users who do not like to use it. As the sponge puff made of closed-cell foam material does not absorb cosmetics, a play of cosmetics takes place between the skin and the sponge puff, so that the puff slips on the skin or produces an unexpected feeling of stiffness when the cosmetics are stopped being applied to the skin. This is why the closed-cell sponge puff is not very popular with users." Also, FR2751854 offers a puff comprising a closed-cell polyurethane foam substrate with polyolefin resin particles of a few microns to several hundred microns in size fused to one side of the substrate.

FR2860960 refers to an applicator formed by a material having a plurality of open-cell cells opening onto the application face coated with a fibre flock.

FR3041510 refers to a cosmetic product packaging and application assembly in which the applicator comprises an applicator element made of a porous, open-cell material.

FR2895887 refers to an applicator with a one-piece, moulded, plastic applicator means comprising one or more retention elements for the product to be applied. These retention elements are recessed and visible to the naked eye, which allows them to be called "macro retention elements".

EP1639912 and FR2868264 also describe such macro retention elements.

It is common practice to manufacture an applicator or a loading/application part made of plastic using the classic injection moulding process (single or multiple injection). The plastic material making up the applicator or loading/application part is melted and injected into a mould at a speed and pressure controlled by a press. After cooling and solidification, the applicator or loading/application part is removed from the mould. In the case of bi-injection, two different plastics are used, e.g. with regard to their hardness. An applicator with a stiffer inner core and a softer peripheral loading/application part can be made. A number of documents show injection moulding or bi-injection, including, by way of example, WO2009049853, WO2009151202, U.S. Pat. No. 8,127,777, EP2172127 and FR2962888. US2009/0045089 further mentions, as a process, disc stacking and additive manufacturing such as stereolithography. US2013/0276812 also mentions 3D printing. EP1070468 mentions injection, compression, stamping, bar turning. With the classical injection moulding process, the material of the manufactured object is characterized by its continuum.

It is also common practice to provide that the outer application surface of a plastic loading/application part is flocked, which improves both the loading of the loading/application part with the product to be applied and the spreadability of the product to be applied, and which involves depositing an adhesive on this surface and then depositing flocks, such as fibres, on the adhesive, as described in document EP1426118 and as a result of a number of documents, including, by way of example, EP1070468, EP2164360, EP3300625, WO2018007620, FR3035577, WO2016108357. Flocking requires a clean manufacturing step and the use of glue, which can be perceived as a disadvantage in view of the contact of the loading/application part with a surface part of the human body or in view of ecological and environmental requirements.

Document WO2017220538 deals with the structure of an applicator and its method of manufacture. This applicator is made from a porous or cellular material, in particular an injected foam, such as polyurethane foam. It comprises a first face and a second face, one and/or the other comprising open cells and resulting from a felting treatment, and an inner portion, by means of a porosity gradient between the faces and the inner portion, namely that the treated faces have a crust of lower porosity and a thickness of between 0.2 and 3 mm, and that the inner portion has a higher porosity and may make it possible to constitute a reserve of product, the cells being open. The felting treatment is a thermoforming process in which the porous material is permanently compressed in a mould, especially a metal mould, with a rise in temperature. Alternatively, a flocking is planned.

EP 1 264 672 concerns a process involving the introduction of a polymeric material mixed with a supercritical fluid additive into a mould, When it comes to cosmetic products to be applied, it is constantly sought that the performance in terms of use of the loading/application part is as high as possible, in terms of ease of use, the tactile impression felt by the user (such as softness), the movement of the loading/application part on the human body when intended, the efficiency of loading the loading/application part with the product to be applied, the efficiency, accuracy and proper distribution of the applied product, the elastic compression in the transverse direction, and an appropriate capacity for transverse elastic bending.

Finally, it is important that the applicator and the loading/application part can be manufactured in large series in an efficient and qualitative way at a reasonable cost.

The invention aims to respond to these different problems and to satisfy these different requirements, in the case of an applicator of the compact type, comprising a loading/application part of the same type.

This is the problem whereon the invention is based.

Plastics injection moulding professionals are aware of the existence of injection moulding processes suitable for the manufacture of objects in the form of foam, such as chemical foaming processes and physical foaming processes.

As regards physical foaming processes using a neutral gas, several variants are known, all of which overcome the disadvantage of chemical foaming agents. Such a physical foaming process is particularly sought-after, compared to conventional injection processes, in that it allows significant material and weight savings of up to 20% or even more. Therefore, the natural outlet for such a physical foaming process is the production of bulky parts for which the amount of material and weight are decisive factors, such as typically vehicle bumpers or dashboards.

In an injection-moulding process with known physical foaming, the thermoplastic material forming the article to be produced is heated to melting temperature by injecting a suitable quantity of inert gas, such as nitrogen or carbon dioxide, in the supercritical state (temperature of about 200° C. and pressure of about 200 bar) into it, so that a homogeneous mixture of the thermoplastic material and the gas in the supercritical state is produced, which is kept under pressure and temperature and is then injected into a mould. Closed cells appear in the moulded mixture and grow in size until the thermoplastic material has become rigid as a result of cooling. This process is described in documents EP0923443, EP0952908, EP1165301, EP1264672, EP1275485 and EP1475208.

In the injection moulding process with physical foaming developed jointly by the Kunstoff-Institut Lündenscheid and Linde, after drying the thermoplastic material is impregnated with inert gas such as carbon dioxide, and then the homogeneous mixture of thermoplastic material and inert gas is injection moulded. As before, closed cells are formed in the moulded mixture, the size of which increases until the thermoplastic material has become rigid as a result of cooling.

Regardless of how the injection moulding process with physical foaming is carried out, there is a succession of steps in which:
  a mould is available, the shape of the impression of which corresponds to the shape of the part to be manufactured by the process,
  thermoplastic material is available which can be melted, injected and moulded in the mould and then cooled by solidifying, and inert gas is available,
  a mixture of thermoplastic material and inert gas is produced,
  the mixture is injected into the mould,
  once the thermoplastic material has cooled and set, and has physically foamed using inert gas, the part thus produced is removed from the mould.

DISCLOSURE OF THE INVENTION

According to a first aspect, the invention relates to a method of manufacturing an applicator for a product to be applied for application to a surface part of the human body, such as a cosmetic product, comprising a loading/application part of the compact type having an outer face, with:
  the sequence of steps in which:

a/ a mould is available whose shape of the impression corresponds to the shape of the loading/application part, b/ on the one hand, a thermoplastic elastomer material is available with a hardness before injection of between 5 Shore A and 70 Shore A, compatible with the product to be applied and capable of being melted, injected and moulded in the mould, then cooled while solidifying, and, on the other hand, inert gas capable of carrying out a physical foaming process, c/ a mixture of thermoplastic elastomeric material and inert gas is produced, d/ this mixture is injected into the mould, e/ once the thermoplastic elastomer material has cooled and set, and its physical foaming has been achieved by means of inert gas, the loading/application part thus produced is removed from the mould, which combines, within it, a closed-cell internal structure and, on the outside, a microporous surface structure, the absence of a deposition step on the microporous surface structure of the previously completed loading/application part of a flock or flock adhesion material.

The embodiment of the loading/application part thus made is favourable to its performance in terms of the tactile impression felt by the user, the efficiency of loading with the product to be applied and then of its application, the movement of the loading/application part on the human body when foreseen, the elastic compression in the transverse direction, and the appropriate capacity for transverse elastic bending.

According to an embodiment, the inert gas in the supercritical state is injected into the previously melted thermoplastic elastomer material so as to mix them, and this mixture is kept under pressure and temperature, and then this mixture of thermoplastic elastomer material and molten gas is injected into the mould.

According to an embodiment, a mould is provided whose cavity is shaped such that the moulded loading/application part has a loading/application portion and a fastening portion integrally arranged end to end along a main direction.

According to an embodiment, there is a mould whose cavity has a shape such that the loading/application portion comprises, towards the microporous surface structure, at least one localised superficial macroregion open towards the outside of the loading/application portion, having a conformation adapted to the loading of the product to be applied, such as a concavity, a depression, a groove, a furrow, a hollow gadroon.

According to one characteristic, with physical foaming a structure is obtained with a barrier function between the microporous surface structure and the inner structure, which is substantially full and prevents communication between the surface micropores and the closed cells.

According to a characteristic, with physical foaming a microporous surface structure is produced which comprises a plurality of open and open-ended surface micropores which do not communicate with the closed inner cells of the inner structure.

According to an embodiment, with physical foaming an intermediate structure is obtained between the microporous surface structure and the closed cells inner structure, the intermediate structure being substantially full and preventing communication between the surface micropores and the closed cells.

According to an embodiment, the method comprises a step of associating the loading/application portion and a stiffening portion capable of imparting strength to the loading/application portion with an appropriate capacity for transverse elastic bending, the stiffening portion being part of the applicator, wherein the stiffening part and the loading/application part are positioned relative to each other such that the stiffening part extends in the main direction within the loading/application part, in particular in a section of its loading/application portion adjoining its fastening portion.

According to an embodiment, the method comprises a step of rigidly associating the fastening portion of the loading/application part and a rigid fastening part forming part of the applicator, wherein the fastening portion and the rigid fastening part are positioned relative to each other such that their association is lateral to the main direction, by bi-injection of the loading/application part and the rigid fastening part.

According to an embodiment, the method comprises a step of rigidly associating a rigid fastening part and an extension part, the rigid fastening part and the extension part being part of the applicator, wherein the rigid fastening part and the extension part are positioned relative to each other such that the extension part extends from the rigid fastening part in the main direction on the opposite side to the loading/application portion of the loading/application part.

According to an embodiment, the method comprises a step of rigidly associating a rigid fastening part and an extension part, the rigid fastening part and the extension part being part of the applicator, wherein the rigid fastening part and the extension part are positioned relative to each other such that the extension part extends from the rigid fastening part in the main direction on the opposite side to the loading/application portion of the loading/application part.

According to a second aspect, the invention relates to an applicator for a product to be applied to a superficial part of the human body, directly manufactured by the manufacturing process just described.

According to a third aspect, the invention has the purpose of an applicator of a product to be applied to a surface part of the human body, such as a cosmetic product, comprising a loading/application part of the product to be applied of the compact type, having an outer face, having a main direction, wherein:

the loading/application part is carried out by the process just described, with an elastomeric thermoplastic material having a hardness before injection of between 5 Shore A and 70 Shore A, compatible with the product to be applied, and an inert gas, the loading/application part which combines, in its interior, a closed-cell inner structure comprising a plurality of closed inner cells and, on the outer side, a microporous surface structure comprising a plurality of open, non-communicating surface micropores which do not communicate with the closed inner cells of the inner structure, any flock or flock adhesion material is absent on the microporous surface structure.

This embodiment of the loading/application part is favourable to its performance in terms of the tactile impression felt by the user, the loading efficiency of the product to be applied, the application efficiency of the product to be applied and then of its application, the movement of the loading/application part on the human body when foreseen, the elastic compression in the transverse direction, and the appropriate capacity for transverse elastic bending.

According to characteristics:

the closed cells of the inner structure are and remain empty of product to be applied, the micropores of the microporous surface structure allow a certain retention of the product to be applied.

According to one characteristic, the inner structure comprises a plurality of closed inner cells whose size tends to be larger in relation to their depth compared to the microporous surface structure and the outer face.

According to an embodiment, the loading/application part comprises an intermediate structure between the microporous surface structure and the closed cells inner structure, the intermediate structure being substantially full and preventing communication between the surface micropores and the closed cells.

According to an embodiment, the loading/application part consists of a loading/application portion and a fastening portion, arranged end to end along a main direction.

According to an embodiment, in addition to the micropores of the microporous surface structure allowing a certain retention of product to be applied, the loading/application portion of the loading/application part comprises at least one localised superficial macroregion open towards the outside of the loading/application portion, having a conformation suitable and intended to be loaded with product to be applied, such as a concavity, a depression, a groove, a hollow gadroon. And, according to an embodiment, the at least one open localized superficial macroregion contains micropores of the microporous surface structure.

According to an embodiment, the applicator comprises a stiffening portion capable of imparting strength to the loading/application portion with an appropriate capacity for transverse elastic bending, associated to the loading/application part, wherein the stiffening part and the loading/application part are positioned relative to each other such that the stiffening part extends in the main direction within the loading/application part, in particular in a section of its loading/application portion adjoining its fastening portion.

According to an embodiment, the applicator has a rigid fastening part rigidly associated with the fastening portion of the loading/application part, the rigid fastening part and the fastening portion being positioned relative to each other so that their association is lateral to the main direction.

According to an embodiment, the applicator has an extension part rigidly associated with the rigid fastening part, in particular by means of butt jointing, the extension part and the rigid fastening part being positioned relative to each other such that the extension part extends from the rigid fastening part in the main direction on the side opposite the loading/application portion of the loading/application part.

According to an embodiment, the applicator has an extension part rigidly associated with fastening part of the loading/application part, the extension part and the fastening part of the loading/application part being positioned relative to each other such that the extension part extends from the rigid fastening part in the main direction on the side opposite the load/application portion of the loading/application part.

Depending on the case, the loading/application part and the rigid fastening part form the same part made by bi injection moulding, the rigid fastening part having no closed cell internal structure or the extension part and the rigid fastening part forming the same part.

Depending on a characteristic, the loading/application part, the loading/application portion, is of the compact type, without elongated fine parts, such as hairs, filaments, pin teeth or the like.

Depending on the case, the loading/application portion has an external shape selected from the shapes of ball, cone, ovoid, bulb, barrel, diabolo, pyramid, pallet or spatula, spoon, if appropriate with an open cavity between arms, or the like, etc., if appropriate with those resembling these, those derived from these, those comprising part of these, such as sectors, caps.

According to an embodiment, the loading/application portion has an external shape whose free end has a transverse dimension that decreases towards the apex.

According to an embodiment, the applicator comprises a handling part and/or a part for removable rigid association with a container and/or a part for closing the opening of a container suitable and intended to receive the product to be applied, in rigid association with the extension part on the side opposite to the loading/application part.

According to a characteristic, the loading/application part has a maximum overall size of about one centimetre in length and diameter and a weight of about 1 gram.

According to a fourth aspect, the object of the invention is an application unit comprising an applicator as just described and a container comprising an opening, suitable and intended to receive the product to be applied.

According to an embodiment, the applicator and the container have removable rigid mutual association means and/or the applicator has a part for closing the opening of the container.

Depending on a particular embodiment for a product to be applied in a liquid to pasty form, such as mascara, the application set includes a wringer mounted in the opening of the container.

According to one characteristic, the closed-cell inner structure is such that when the loading/application portion of the loading/application part is moved through the wringer, it is radially elastically compressed.

DETAILED DESCRIPTION OF THE INVENTION

The following detailed description is to be understood with reference to what has been set out above to which express reference is made, as regards the context of the invention and the meaning of defined terms and expressions, such as, in particular, "product to be applied", "loading/application part", "apply" and "application", "cosmetic product", "tapered", "compact", "physical foaming". As a result, this context and these definitions are not repeated in the detailed description that follows.

The term "part" or "portion" should be understood to mean a particular element of a whole. Depending on the case, this element is particular with regard to structural and/or functional characteristics. Depending on the case, this element is either a separate physical entity, such as a part, materially distinct from other entities, or, on the contrary, it belongs to and is integrated into the entity forming the whole, as an element of the whole with its own function. Thus, depending on the case, when a whole comprises several parts or portions, these parts or portions are either formed of separate pieces or are not formed of separate pieces.

The term "principal direction" applied to an element should be understood to mean the notional centre line around and along which the element is arranged. This line is straight or curvilinear or other. For example, for an elongated cone-shaped element, the main direction is the axis of the cone passing through the apex.

The term "lateral" is to be understood as referring to what is on the side of the main direction.

The term "transversal" is to be understood as referring to what is substantially and globally perpendicular to general direction XX.

Figure 1:
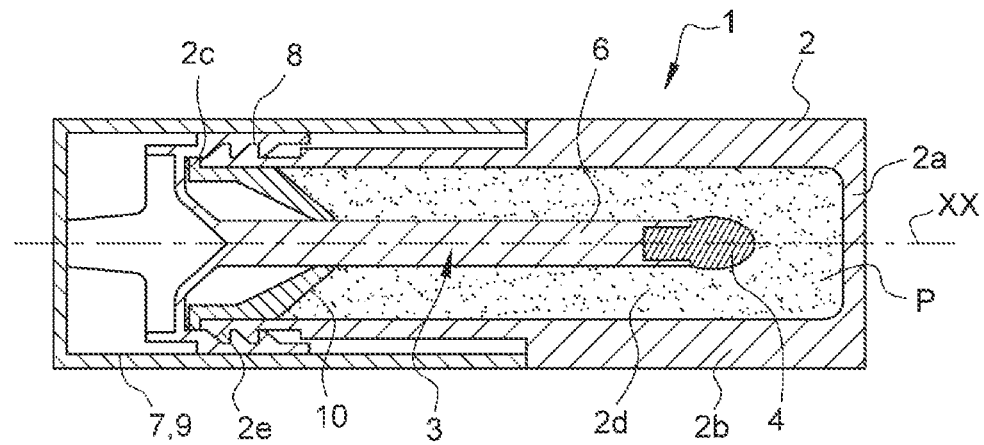
FIG. 1 is an axial sectional view (general direction XX) of an application assembly comprising a container and an applicator.

Reference is made to FIG. 1 which illustrates a possible embodiment of an application set 1 comprising a container 2 and an applicator 3.

In this embodiment, container 2 has the general shape of an elongated tube along a main direction XX with a bottom 2a, a peripheral side wall 2b and opposite to the bottom 2a an opening 2c.

Container 2 has an interior space 2d suitable and intended to receive, on the one hand, a product to be applied P, here for example a cosmetic product in liquid, paste, emulsion or powder form, such as mascara, and on the other hand, the applicator 3, or at least a loading/application part 4 thereof so that it is immersed in the application compound P in the interior space 2d.

The invention relates both to the application set 1 filled with product to be applied, assembled, closed, and ready for use, and to the application set 1 disassembled or not completely assembled or empty of product to be applied P.

Applicator 3 comprises, extending in the main direction XX, the loading/application part 4, also extending in the main direction XX, a rigid fastening part 5, an extension part 6 arranged end to end. The applicator 3 also comprises a handling part 7, a removable rigid association part 8 to the container 2, a sealing part 9 of the opening 2c of the container 2, which parts 7, 8 and 9 are in rigid association with the extension part 6 on the opposite side to the loading/application part 4. In the embodiment shown, the handling part 7, the rigid detachable connecting part 8 and the sealing part 9 are designed as a single unit in the form of a handling cap, here provided with an internal thread which can cooperate with an external thread on the neck 2e. These two complementary threads constitute rigid mutual removable means of rigid association container 1/applicator 3.

In this embodiment, application set 1 also includes a wringer 10 mounted on neck 2e in opening 2c.

This embodiment of application set 1 is not exclusive of variants. For example, container 2 may be other than a tube, applicator 3 may extend not in one main direction XX, but its loading/application part 4 may be inclined with respect to the extension part 6, the means of rigid mutual removable association container 1/applicator 3 may be other than internal and external threads. The wringer can be realized in several possible ways and, possibly, a wringer may be omitted. And, depending on the case, the main direction XX can be straight or curvilinear or other. Therefore, the main direction XX referred to later is considered to be in substance that of the loading/application part 4.

The application set 1 described is not exclusive of other different embodiments, for example adapted to a cosmetic product being in powder or lipstick form or a product to be applied by dabbing.

Special reference is made to FIGS. 2A to 2F and 3 which illustrate an applicator 3 adapted to the application of a product P, such as a cosmetic product, to be applied to a superficial part of the human body, such as the eyes, cheeks, lips. Its loading/application part 4 comprises, in one piece, a loading/application portion 4a and a fastening portion 4b, arranged end to end along the main direction XX. If both portions 4a and 4b are part of the one and only part that is loading/application part 4, they are identified to distinguish the respective functions they perform. The function of the loading/application portion 4a is to load the product to be applied P and then subsequently apply it to the surface part of the human body under consideration. The function of fastening portion 4b is to fix the loading/application part 4 to the rigid fastening part 5 (FIGS. 2A to 2F) or the extension part 6 (FIG. 3), depending on the embodiment, so that it can be used.

As shown in FIGS. 2A to 2F and 3, applicator 3, and thus its loading/application part 4, is of the compact type and not of the tapered type, i.e. it is free of elongated fine parts, such as hairs, filaments, spike teeth or the like.

Being of the compact type, depending on the case and the intended use, the loading/application portion 4a has an external shape selected from the shapes of ball, cone, ovoid, bulb, barrel, diabolo, pyramid, pallet or spatula, spoon, if necessary with an open cavity between arms, or similar, etc., where appropriate, this list being only illustrative, shapes resembling those just mentioned, shapes derived from those just mentioned, shapes comprising only part of those just mentioned, such as sectors or caps.

Depending on the case and the intended use, the outer shape of the loading/application portion 4a is, or is not, rotational or symmetrical, in relation to the general direction XX.

Depending on the case and intended use, the loading/application portion 4a has an external shape with the free end 4c, opposite to the fastening portion 4b, having a transverse dimension that decreases towards the apex. As shown in FIGS. 2A to 2F and 3, the free end forming the apex is not thin and elongated, but rounded.

The loading/application part 4 is made of an elastomeric thermoplastic material M with a hardness before injection of between 5 Shore A and 70 Shore A, which is conventionally referred to as elastomeric thermoplastic material M.

The loading/application part 4 shall have a maximum overall size of the order of one centimetre for the longest length counted in the main direction and the transverse diameter, and a weight of the order of 1 gram. In the embodiments shown in the figures, the transverse thickness is variable.

Although small in size, volume and weight, the loading/application part 4 is carried out by an injection moulding process with physical foaming by means of a neutral gas G (and therefore without any chemical foaming).

With this physical foaming, by means of the neutral gas G, of this elastomeric thermoplastic material M, the filler/application part 4 combines, in its interior 4e, i.e. in its mass, a closed-cell inner structure 11 comprising a plurality (and even a multiplicity) of closed inner cells 11a and, on its outer face 4d, a microporous surface structure 12, comprising a plurality of open and emerging surface micropores 12a, which do not communicate with the closed inner cells 11a of the inner structure 11. The two structures 11 and 12 are also functional. They are permanent, i.e. they exist as soon as the loading/application part 4 is carried out by injection moulding by means of physical foaming and they continue to exist thereafter when loading/application part 4 is used to apply the product to be applied P.

The term "outside" in the expression "outside face" of the loading/application part 4 should be understood to mean what constitutes the furthest edge and boundary of the loading/application part 4.

The outer face 4d has a portion 4da belonging to its loading/application portion 4a of the loading/application portion 4 and a portion 4db belonging to its fastening portion 4b. The portion 4da of the outer face 4d belonging to the loading/application portion 4a is a loading/application portion. This 4da portion is free, in contact with the outside, visible, accessible. It is capable of coming into contact with the product to be applied P in container 2, in particular to load it, and it is capable of being applied to the surface part of the human body considered for the application of the product to be applied P to it.

By "internal structure" is meant the arrangement of the interior of the loading/application part 4, in the inside 4e. By "surface structure" is meant the arrangement of the outer side 4d of the loading/application part 4. The inside 4e is what is separated from the outside 4d in the mass of the loading/application part 4.

The term "closed inner cell" means an enclosed space, with no communication with the outside, empty of the thermoplastic elastomer material M constituting the loading/application part 4, filled with gas G following the implementation of physical foaming. Such a cell 11a is compressible to some extent when subjected to external compressive stress. This compression is elastic, with cell 11a returning to its pre-compression state once the external compressive stress has ceased.

Two adjacent cells 11a are separated from each other by a certain thickness of the elastomeric thermoplastic material M constituting the loading/application part 4.

A closed inner cell 11a may be formed either by a single continuous localized void or by a few adjacent voids communicating with each other and located in a region of limited extent. For example, over a larger area of loading/association part 4, cells 11a are closed and separated from each other, with no communication between them. Thus, the plurality of cells 11a does not form an open communicating network for the entire loading/application part 4.

When applying applicator 3, the closed cells 11a of the inner structure 11 are and remain empty of the product to be applied P, as the product cannot reach them, even in the event of external compressive stress followed by relaxation due to the absence of stress.

The shape of the cells 11a results from the physical foaming that takes place. Theoretically, in the absence of a stress differential at the location of a cell 11a, the cell should have a spherical or pseudo-spherical shape. But the achievement of such a result may be thwarted if there is a stress differential or material heterogeneity.

The physical foaming control parameters affect the characteristics of cells 11a such as mean or median size, size distribution, number, density, arrangement and spatial distribution. In one embodiment, it is intended that loading/application part 4 has a multiplicity of cells 11a (e.g. more than 100) arranged and distributed throughout loading/application part 4, with the exception of an intermediate structure 13, which is discussed below.

The inner structure 11 is therefore the opposite of a sponge in which the cells communicate with each other and with what is outside its outer face, so that it can take on any product outside its outer face.

Nor is the inner structure 11 comparable to a simple cavity, even if closed, in the loading/application part 4. Nor is it comparable to a loading/application part 4 which would be entirely hollow.

The term "open, open and unobstructed surface micropore" means a very small cavity in the outer face 4d of loading/application part 4, which small cavity is open and unclosed and opens to the outside of the outer face 4d of loading/application part 4. Such a micropore 12a can be considered as an alteration of the surface condition of the outer side 4d, resulting from physical foaming. Such a micropore 12a can be described as "micro" in that it is of negligible depth in relation to the 4d outer surface, is invisible or practically invisible to the naked eye, and is not or hardly individually sensitive to touch. The presence of the micropores 12a contributes, together with the internal structure 11, to a touch (static touch or gliding) with a soft feel, whether or not there is product to be applied P loaded. The user who applies the application part for the application of the product to be applied P to the surface part of the human body in question does not perceive any unpleasant rigidity. Such a micropore 12a is void of the thermoplastic elastomer M constituting the filler/application part 4. Once the applicator 3 has been manufactured, and before use, a micropore 12a is empty. When loading the loading/application part 4 with the application material P, the micropore 12a fills with the application material P, the micropores 12a allowing a certain retention of application material P.

The shape of the micropores 12a results from the physical foaming that takes place. Theoretically, a micropore 12a is such that its depth (counted perpendicular to the outer face 4d) is very small and almost negligible compared to the dimension of its opening (counted in the outer face 4d).

The physical foaming control parameters influence the characteristics of the micropores 12a such as size, number, density, arrangement and distribution on the outside 4d. In one embodiment, it is provided that loading/application part 4 has a multiplicity of micropores 12a arranged and distributed over the entire loading/application part 4.

The surface structure 12 is therefore the opposite of the surface structure of a sponge.

The surface structure 12 is also not comparable to a honeycomb structure on the outside 4d of loading/application part 4. Nor is it comparable to a localized open superficial macroregion, such as a concavity, a hollow, a depression, a groove, a furrow, a hollow gadroon.

The closed cell inner structure 11a and the micropore surface structure 12a are such that when the loading/application portion 4a of the loading/application part 4 is moved through the wringer 10, the inner structure 11 is radially elastically compressed and the surface structure 12 is wiped so as to remove excess application product P from the application product P remaining in the micropores 12a.

In order to ensure that the loading/application portion 4a of loading/application part 4 can be loaded with sufficient product (for application efficiency and to avoid the need for frequent refills of the product to be applied P), provision can also be made for loading and retention of product to be applied P, that the portion 4da of the outer face 4d of the loading/application portion 4a of the loading/application part 4 comprises at least one localised superficial macroregion 14 open towards the outside (and thus towards the product to be applied P located in the inner space 2d of the container 2), the conformation of which is designed to be suitable and intended to be loaded with product to be applied P. Such a conformation can be described as a "macro region", in that, unlike a micropore, it is of substantial depth in relation to the outer envelope of the outer face 4, and is visible to the naked eye and individually sensitive to touch.

Such a macro region 14 can be made in the form of a concavity, a depression, a groove, a furrow, a hollow gadroon, sufficiently marked and deep.

Such an open localized surface macroregion 14 may have micropores 12a of the microporous surface structure 12.

With such a macro region 14, the micropores 12a, and a wringer 10, one tends to minimize or eliminate the constitution on the portion 4da of the external face 4d of a thickness of product to be applied P hindering its application on the surface part of the human body considered.

Figure 4:
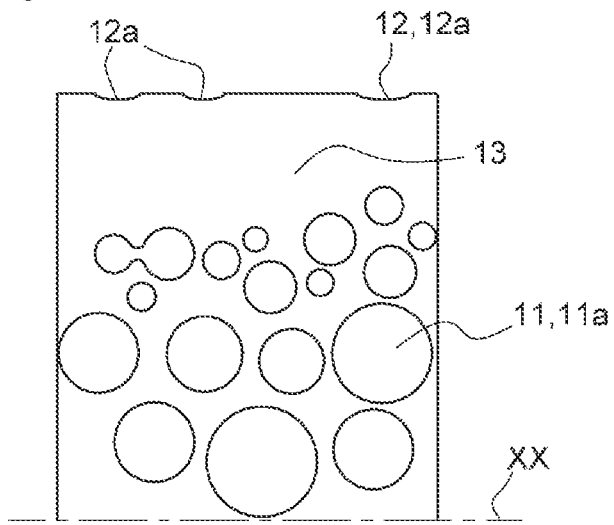
FIG. 4 is a schematic, partial cross-sectional view along section line IV-IV of FIG. 2A, at a larger scale, of the loading/application portion, illustrating its closed-cell interior structure having a plurality of closed interior cells, its microporous surface structure having a plurality of open and opening surface micropores, and its intermediate structure being substantially solid.

With physical foaming of the thermoplastic elastomer M by means of inert gas G, a structure with an intermediate barrier function 13 between the two structures 11 and 12 can be produced in the loading/application part 4. This barrier function structure 13 is substantially solid, i.e. made of elastomeric thermoplastic material M, and thus prevents communication between the surface micropores 12a and the closed cells 11a, and thus the passage of application material P to the inner structure 11 (FIG. 4). In other words, there is a continuum of thermoplastic elastomer M between the closed-cell inner structure 11 and the microporous surface structure 12. This continuum can be more or less thick and more or less regular, and the limit is more or less blurred. The very fact that there is no communication between the micropores 12a and the closed cells 11a indicates the existence of such a structure with a barrier function 13, without the need for a layer of thermoplastic elastomer M material, of substantial thickness, well limited and identified as constituting a material structure.

Any flock adhesion material or flock is absent on the outer surface 4d and on the microporous surface structure 11, contrary to the general knowledge of the applicators of the type in question. As a result, applicator 3 is free of flock and has the outer side 4d with the microporous surface structure 11 to the direct touch, not a flock or flocked side.

The constitution of the loading/application part 4 just described is favourable to its performance of use in terms of the tactile impression felt by the user, the efficiency of loading with the product to be applied P, the process of application of the product to be applied P and the rendering of this application, where applicable the movement of the loading/application part 4 on the part of the human body considered when foreseen, the elastic compression in the transverse direction, and the appropriate capacity for transverse elastic bending, for example when applied to the part of the human body considered.

The loading/application part combines an overall fit with some appropriate transverse elastic bending capacity, localized elastic compressive capacity, and a soft touch.

A ready-to-use applicator 3—at least its loading/application part 4—is produced by means of the method now described, which differs from the conventional injection-moulding method.

In the first place, the process of the invention comprises the following sequence of steps:

a/ a mould is available whose shape of the impression corresponds to the shape of the loading/application part 4, b/ there is available, on the one hand, elastomeric thermoplastic material M with a hardness before injection of between 5 Shore A and 70 Shore A, compatible with the product to be applied P and an inert gas G and capable of being melted, injected and moulded in the mould, then cooled while solidifying, and, on the other hand, inert gas G capable of carrying out a physical foaming process, c/ a mixture of elastomeric thermoplastic material M and inert gas G is produced, d/ this mixture is injected into the mould, e/ once the thermoplastic elastomer M has cooled and set, and its physical foaming has been achieved by means of inert gas G, the loading/application part 4 thus produced is removed from the mould.

As described above, the loading/application part 4 then has the combination of a closed-cell 11a inner structure 11 and a microporous surface structure 12, the characteristics of which are as described above.

Secondly, with the method of the invention, there is no step of depositing on the previously realized microporous surface structure 12 of a flock or flock adhesion material.

With the previous steps a/ to e/, the loading/application part 4 is carried out directly and in one go.

Foaming is exclusively physical by means of the neutral gas G, not chemical.

It can be the subject of various achievements.

The G gas is for example nitrogen or carbon dioxide, these two realisations being not exclusive of others, as long as the G gas is inert, suitable for the implementation of a physical (and not chemical) foaming process.

According to an embodiment, the inert G gas in the supercritical state is injected into the previously melted thermoplastic elastomer material M so as to mix them, and this mixture is kept under pressure and temperature, and then this mixture of thermoplastic elastomer material M and molten gas G is injected into the mould.

In order for the loading/application part 4 to comprise, in one piece, the loading/application portion 4a and the fastening portion 4b, as previously described, a mould is provided whose cavity has a shape complementary to the loading/application portion 4a and the fastening portion 4b.

In order to create the at least one localized superficial macroregion 14 open to the outside, as previously described, a mould with a shape complementary to this macroregion 14 is available.

Figure 2A:
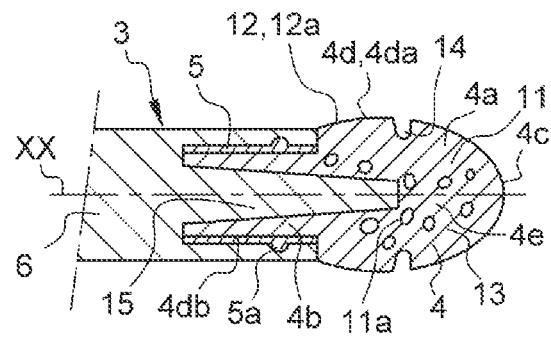
FIG. 2A is a partial axial section view of a variant applicator embodiment, showing its loading/application portion with its loading/application portion and its fastening portion, each of the applicators also having a fastening portion and an extension portion.
Figure 2B:
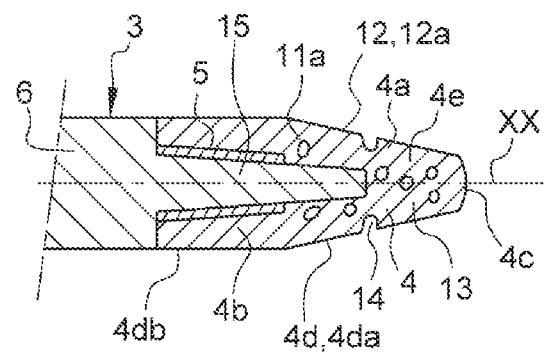
FIG. 2B is a partial axial section view of a variant applicator embodiment, showing its loading/application portion with its loading/application portion and its fastening portion, each of the applicators also having a fastening portion and an extension portion.
Figure 3:
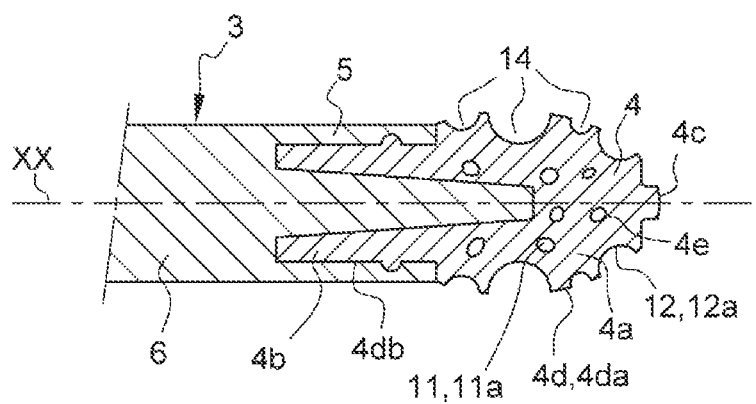
FIG. 3 is a partial axial section view of another applicator embodiment variant, showing its loading/application part with its loading/application portion and its fastening portion, the applicator also having a fastening portion, an extension portion, an internal stiffening part forming a single piece set.

Refer to FIGS. 2A, 2B and 3, which illustrate that applicator 3 may include a stiffening part 15, capable of imparting strength to the loading/application portion 4a while having an appropriate transverse elastic bending capacity. This stiffening part 15 is associated with the loading/application part 4, the two parts 15 and 4 being positioned relative to one another such that the stiffening part 15 extends in the main direction XX inside the loading/application part 4, in particular in a section of its loading/application portion 4a adjoining its fastening portion 4b. The presence of such a stiffening part 15 makes it possible to make a rigid core type applicator. In the embodiments shown, stiffening part 15 has a smaller transverse dimension towards the loading/application portion 4a and a larger transverse dimension away from the loading/application portion 4a. Stiffening part 14 is made of a harder material than loading/application part 4, so that it has a certain stiffness. Depending on the case, the production is either with two separate parts of different hardness (FIGS. 2A and 2B) or with one and the same part produced by bi-injection (FIG. 3).

With such an achievement, the process also includes a step of association of the two parts 15 and 4.

Refer to FIGS. 2A through 2F and 3 which illustrate that applicator 3 may have a rigid fastening portion 5 rigidly associated with fastening portion 4b of load/application part 4. The rigid fastening portion 5 and the fastening portion 4b are positioned in relation to each other so that their association is lateral, in particular peripheral, in relation to the main direction XX. The rigid fastening part 5 is designed to attach the loading/application part 4 to the rest of the applicator 3 so that the loading/application part 4 can be manoeuvred, implemented and used without having to grasp it directly. Rigid fastening part 5 is made of a harder material than loading/application part 4, so that it has a certain stiffness. Depending on the case, the embodiment is either with one and the same part (loading/application part 4/rigid fastening part 5) made by bi-injection (FIGS. 2A to 2F and 3), or with two distinct parts of different hardness. In the case where the rigid fixation part 5 is injected in the bi-injection process, it can be provided that this rigid fixation part 5 has no closed cell internal structure, being made without physical foaming.

In the bi-injection embodiment of FIG. 2A, the rigid fastening part 5 has a generally cylindrical ferrule shape having the main direction XX, arranged at the periphery of the portion 4db of the outer face 4d of the fastening portion 4b, without entering the loading/application portion 4a, and by means of a groove and projection structure 5a. Here, the rigid fastening part 5 is located inside the applicator 3.

In the embodiment of FIG. 2B, the rigid fastening part 5 has a generally frustoconical cylindrical ferrule shape having the main direction XX, arranged at the periphery of the stiffening part 15.

Figure 2C:
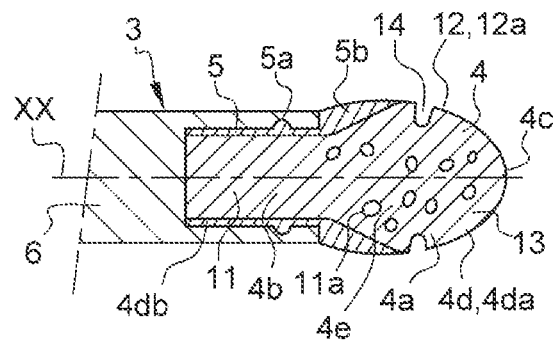
FIG. 2C is a partial axial section view of a variant applicator embodiment, showing its loading/application portion with its loading/application portion and its fastening portion, each of the applicators also having a fastening portion and an extension portion.

The embodiment of FIG. 2C is derived from that of FIG. 2A, the rigid fastening part 5 being located partly inside the applicator 3 and partly outside, towards the loading/application portion 4a, surrounding it in a kind of corolla 5b.

Figure 2D:
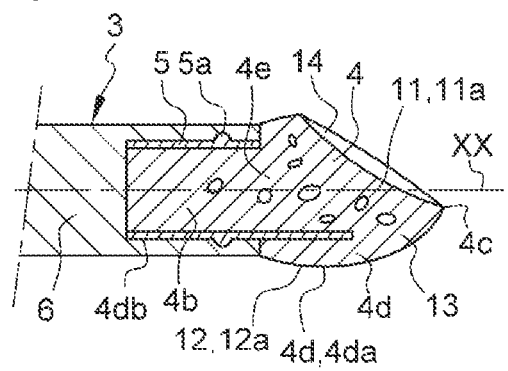
FIG. 2D is a partial axial section view of a variant applicator embodiment, showing its loading/application portion with its loading/application portion and its fastening portion, each of the applicators also having a fastening portion and an extension portion.

The embodiment of FIG. 2D is derived from that of FIG. 2A, the rigid fastening part 5 having a truncated cylinder shape, so as to correspond to the truncated shape of the loading/application portion 4a.

Figure 2E:
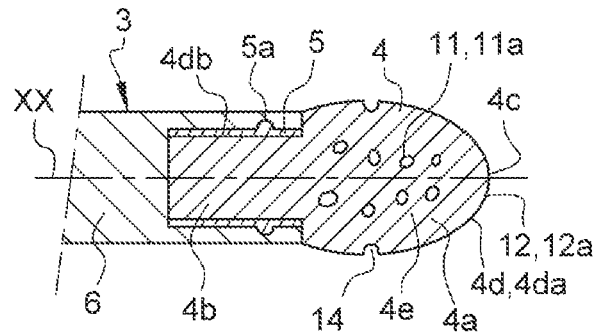
FIG. 2E is a partial axial section view of a variant applicator embodiment, showing its loading/application portion with its loading/application portion and its fastening portion, each of the applicators also having a fastening portion and an extension portion.

The embodiment of FIG. 2E is identical to that of FIG. 2A, except that the loading/application part does not have a stiffening web.

Figure 2F:
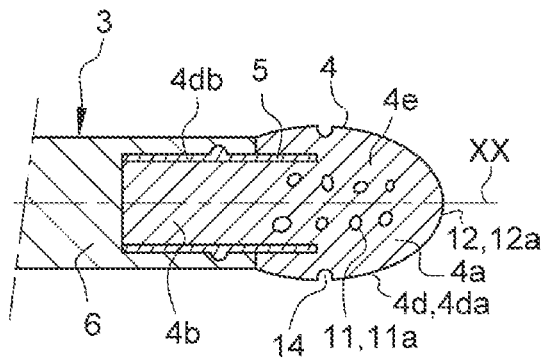
FIG. 2F is a partial view in axial section of an applicator embodiment variant, showing its loading/application part with its loading/application portion and its fastening portion, each of the applicators also having a fastening part and an extension part, and for FIGS. 2A and 2B also comprising an internal stiffening part belonging to the extension part, whereas for each embodiment variant, the loading/application part and the fastening part are made by bi-injection moulding and thus mutually integral, whereas the independently constructed extension part is made integral with the fastening part by butt-jointing. In these six views, the extension part is shown with a short length.

The embodiment of FIG. 2F is identical to that of FIG. 2A, except that, unlike the latter, rigid fastener part 5 enters the loading/application portion 4a.

The embodiment of FIG. 3 is similar to that of FIG. 2A, except that the embodiment is in two parts joined by butt-jointing, not bi-injection.

The embodiments just described are not exclusive to others.

With such embodiments, the process also includes a step of rigid association of the rigid fastening portion 5 and the fastening portion 4b of the loading/application portion 4.

Reference is made to FIGS. 2A to 2F which illustrate an embodiment in which applicator 3 may have an extension part 6 rigidly associated with rigid fastening part 5. The extension part 6 and the rigid fastening part 5 are positioned relative to each other so that the extension part 6 extends from the rigid fastening part 5 in the main direction XX on the opposite side to the loading/application portion 4a of the loading/application part 4.

While the loading/application part 4 and the rigid fastening part 5 form a single part made by bi injection moulding, the rigid fastening part 5 forms a separate part. With this embodiment, the process includes a step of rigid association of the rigid fastening part 5 and the extension part 6, by butt-jointing.

The extension part shall extend along its main direction for a length sufficient for the size of container 2.

The extension part has a certain rigidity to give it a certain strength, with, where appropriate, an appropriate capacity for transverse elastic bending.

Refer to FIG. 3 which illustrates another embodiment in which the applicator 3 may have an extension part 6 rigidly associated with fastening portion 4b of load/application part 4. With this embodiment, the extension part 6 and the rigid fastening part 5 form a single part.

It is understood that the loading/application part 4 and the extension part 6 each extend in one main direction, the two main directions being parallel, and where appropriate, merged, or inclined to each other.

The invention claimed is:

1. A method of manufacturing an applicator for a product to be applied to a surface portion of the human body, comprising:

Injecting a mixture of a thermoplastic elastomer material and an inert gas into a mould corresponding to the shape of the product, the thermoplastic elastomer material having a hardness before injection of between 5 Shore A and 70 Shore A, the inert gas capable of carrying out a physical foaming process, and after the thermoplastic elastomer material has set and physical foaming has taken place, removing hardened thermoplastic elastomer material from the mould, the hardened thermoplastic elastomer material having closed cellular inner structure and an outer microporous surface structure.

2. A method according to claim 1, wherein the mixture is formed by injecting the inert gas in the supercritical state into the previously melted thermoplastic elastomer material so as to mix them, and this mixture is kept under pressure and temperature, and then this mixture of thermoplastic elastomer material and molten gas is injected into the mould.

3. A method according to claim 1, wherein the mould is provided whose cavity is shaped with a moulded loading/application part including a loading/application portion and a fastening portion integrally arranged end to end along a main direction.

4. A method according to claim 3, wherein the mould is provided whose cavity has a shape such that the loading/application portion comprises, towards the microporous surface structure, at least one localised superficial macroregion open towards the outside of the loading/application portion, having a conformation adapted to the loading of the product to be applied, including at least one of a concavity, a depression, a groove, a furrow, or a hollow gadroon.

5. A method according to one of claim 1, wherein with physical foaming an inner structure is produced comprising a plurality of closed inner cells whose size becomes larger as a function of their depth relative to the microporous surface structure and an outer face of the hardened thermoplastic elastomer material.

6. A method according to claim 1, wherein with physical foaming a microporous surface structure is produced which comprises a plurality of open and open-ended surface micropores which do not communicate with the closed inner cells of the inner structure.

7. A method according to claim 1, wherein with physical foaming a structure is obtained with a barrier function between the microporous surface structure and the inner structure, which is substantially full and prevents communication between the surface micropores and the closed cells.

\* \* \* \* \*